UNITED STATES PATENT OFFICE.

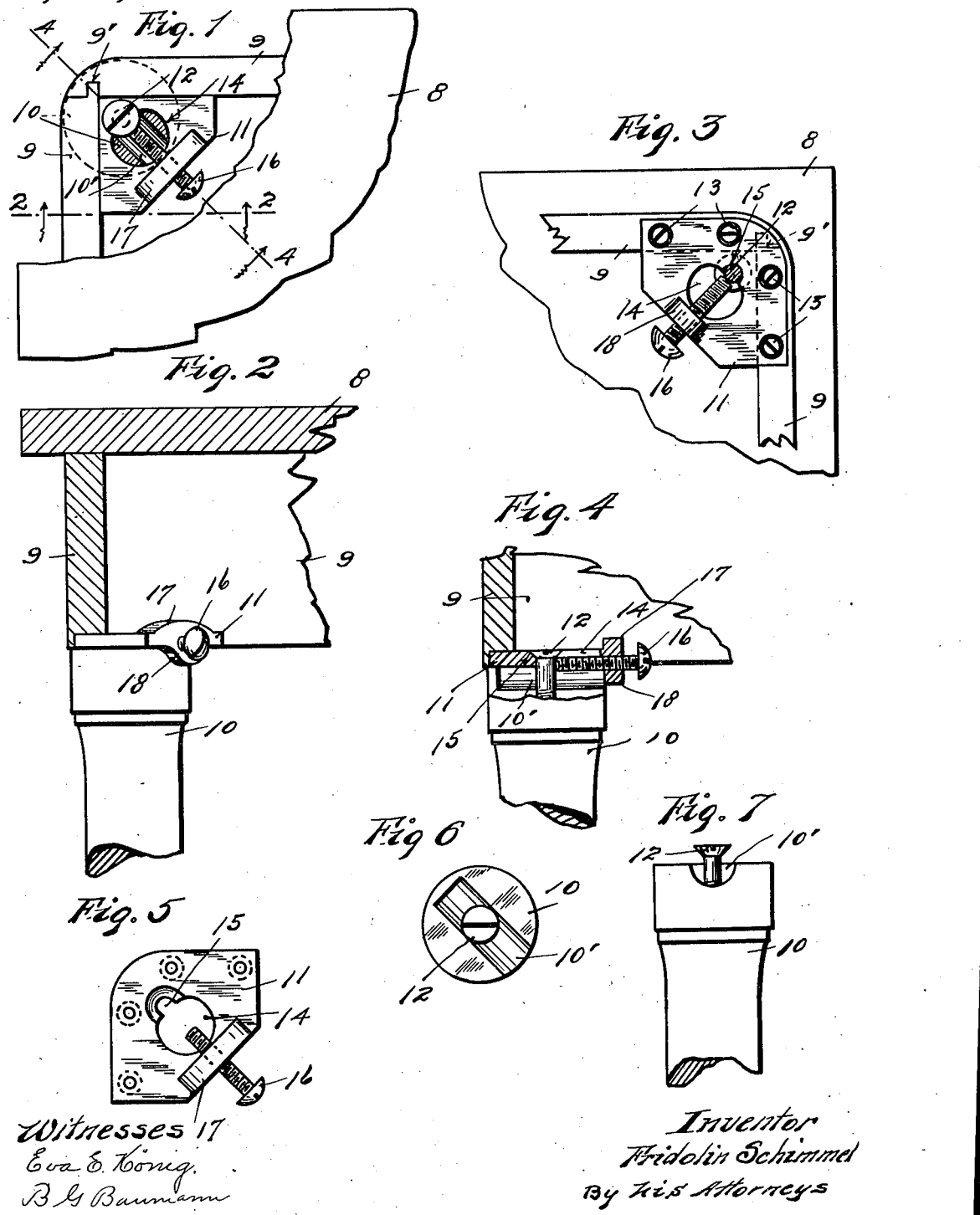

FRIDOLIN SCHIMMEL, OF FARIBAULT, MINNESOTA.

LEG-COUPLING.

1,292,090.  Specification of Letters Patent. Patented Jan. 21, 1919.

Application filed August 5, 1918. Serial No. 248,467.

*To all whom it may concern:*

Be it known that I, FRIDOLIN SCHIMMEL, a citizen of the United States, residing at Faribault, in the county of Rice and State of Minnesota, have invented certain new and useful Improvements in Leg-Couplings; and I do hereby declare the following to be a full, clear, and exact description of the invention, such as will enable others skilled in the art to which it appertains to make and use the same.

My invention has for its object to provide an extremely simple and highly efficient leg coupling for tables and the like; and, to this end, it consists of the novel devices and combinations of devices hereinafter described and defined in the claims.

In the accompanying drawings, which illustrate the invention, like characters indicate like parts throughout the several views.

Referring to the drawings:

Figure 1 is a fragmentary top view of a table having the invention incorporated therein;

Fig. 2 is a view partly in elevation and partly in section taken on the line 2—2 of Fig. 1;

Fig. 3 is a bottom plan view of the parts shown in Fig. 1, with the exception that the headed stud is sectioned and the leg removed;

Fig. 4 is a view partly in elevation and partly in section taken on the line 4—4 of Fig. 1;

Fig. 5 is a plan view of the bracket removed from the table;

Fig. 6 is a top view of the leg; and

Fig. 7 is a side elevation of the leg looking into the groove formed in the top thereof.

The numeral 8 indicates a table top supported on side and end rails 9, only two of which are shown. These rails 9 are connected by an interlocking joint 9'. A supporting leg 10 is detachably secured to the rails 9, by my improved coupling.

The improved leg coupling comprises a bracket 11 and a head stud 12 detachably interlocked, the one with the other. The bracket 11 is in the form of a flat horizontal plate that extends across the corner between the rails 9 and is rigidly secured to the lower edge, of each thereof, by a pair of wood screws 13. Preferably, as shown, the bracket 11 is set into rails 9, slightly inward of the outer faces thereof, so as to be out of sight. The heads of the screw 13 are also preferably countersunk in the bracket 11.

In the center of the bracket 11 is a substantially round hole or passageway, having formed therewith, a contracted lock notch 15 which extends into the corner between the rails 9. The upper edge portion of the lock notch 15 is countersunk for a purpose that will presently appear. A lock screw 16 has screw threaded engagement with the oblique portion of the bracket 11 and its inner edge portion extends into the passageway 14 in alinement with the lock notch 15. To strengthen the bracket 11 and give the same sufficient stock to receive the lock screw 16, there is integrally formed with the upper and lower surfaces thereof, a rib 17 and a lug 18, respectively.

The headed stud 12, as shown, is in the form of a heavy wood screw that is screwed axially into the leg 18 from its top thereof. The size of the passageway 14 is such as to permit the head of the screw 12 to be inserted therethrough by an endwise movement of the leg 10 and the lock notch 15 is of such size as to snugly receive the body of the screw 16 by a lateral movement of the leg 10. By turning the screw 12 more or less into the leg 10, the head thereof may be adjusted into a position to enter the countersunk portion of the bracket 11 and thereby secure the leg to the table against endwise movement.

Before the screw 12 is inserted into the passageway 14 the lock screw 16 must, of course, be withdrawn from said passageway sufficiently to afford clearance therefor. After the screw 12 is inserted into the lock notch 15 the screw 16 is adjusted into the passageway 14 until the inner end thereof impinges against the body of the screw 12 and thereby securely holds the same in the lock notch. If for any cause, the connection between the bracket 11 and headed stud 12 should become loose said stud may be axially adjusted into the leg to again tighten the connection. A radial groove 10' is formed in the top of the leg 10 to afford clearance for the lock screw 16.

From the above description it is evident that the leg 10 may be very quickly applied to or removed from the table. It is also evident that the improved coupling affords a very rigid and substantial connection between the table and leg and the bracket thereof affords additional means for connecting the rails of the table top. The improved coupling has in actual usage proven highly efficient for the purpose had in view.

What I claim is:

1. The combination with the end and side rails of a table or the like, and a supporting leg therefor, of a bracket connecting said rails and having an entrance passageway with a contracted lock notch, a headed stud secured to the leg and arranged to be inserted into the passageway and interlocked with the lock notch thereof, and a lock screw having screw threaded engagement with the bracket and extending in the path of movement of the headed stud to positively hold the same in the lock notch.

2. The combination with the end and side rails of a table or the like, and a supporting leg therefor, of a bracket secured to the rails and connecting the same and having an entrance passageway with a contracted lock notch, a headed stud secured to the leg for longitudinal adjustment with respect thereto, said headed stud arranged to be inserted into the passageway and interlocked with the lock notch thereof, a lock screw having screw threaded engagement with the bracket, arranged to impinge against the headed stud for positively securing the same within the lock notch.

3. The combination with the end and side rails of a table or the like, and a supporting leg therefor, of a bracket secured to the lower edges of the rails and connecting the same, said bracket having an entrance passage with a contracted lock notch, a screw secured in the upper end of the leg with its headed end arranged to be inserted through the passageway by an axial movement of the leg and with its body arranged to be inserted into the lock notch by a lateral movement of the leg, and a lock screw having screw threaded engagement with the bracket, extending across the passageway and impinging against the screw in the leg to hold the same against lateral movement from said contracted lock notch.

4. The combination with the end and side rails of a table or the like, and a supporting leg therefor, of a bracket secured to the lower edges of the rails and connecting the same, said bracket having an entrance passage with a contracted lock notch the upper edge of which is countersunk, a screw secured in the upper end of the leg, the headed end of the screw arranged to be inserted through the passageway by an axial movement of the leg, and the body of the screw arranged to be inserted into the lock notch with its head seated in the countersunk portion thereof by a lateral movement of the leg, and a lock screw having screw threaded engagement with the bracket, extending across the passageway and impinging against the body of the screw in the leg, said leg having a radial notch extending from the screw therein for receiving the lock screw.

In testimony whereof I affix my signature in presence of two witnesses.

FRIDOLIN SCHIMMEL.

Witnesses:
C. M. STOCKTON,
HENRY SCHLATTER.